(12) United States Patent
Pirone

(10) Patent No.: US 10,206,533 B2
(45) Date of Patent: Feb. 19, 2019

(54) ADDITIVATION DEVICE FOR BEVERAGES AND METHOD THEREOF

(71) Applicant: Bruno Pirone, Cuneo (IT)

(72) Inventor: Bruno Pirone, Cuneo (IT)

( * ) Notice: Subject to any disclaimer, the term of this patent is extended or adjusted under 35 U.S.C. 154(b) by 0 days.

(21) Appl. No.: 14/437,757

(22) PCT Filed: Oct. 17, 2013

(86) PCT No.: PCT/IB2013/059425
§ 371 (c)(1),
(2) Date: Apr. 22, 2015

(87) PCT Pub. No.: WO2014/064586
PCT Pub. Date: May 1, 2014

(65) Prior Publication Data
US 2015/0272373 A1    Oct. 1, 2015

(30) Foreign Application Priority Data

Oct. 23, 2012 (IT) ............... TO2012A0930

(51) Int. Cl.
*A47J 31/40* (2006.01)
*C02F 1/74* (2006.01)
*C02F 1/68* (2006.01)

(52) U.S. Cl.
CPC ............ *A47J 31/40* (2013.01); *C02F 1/686* (2013.01); *C02F 1/74* (2013.01); *C02F 2201/006* (2013.01)

(58) Field of Classification Search
CPC ..... C20F 1/686; A47J 31/40; C02F 2201/006; C02F 1/74

(Continued)

(56) References Cited

U.S. PATENT DOCUMENTS 7,930,972 B2 *  4/2011  Denisart ............... A47J 31/002
                                                  99/295
7,992,488 B2 *  8/2011  Mahlich ............... A47J 31/401
                                                  99/287

(Continued)

FOREIGN PATENT DOCUMENTS

CN    101773796     7/2010
JP    2011130422    6/2011

(Continued)

OTHER PUBLICATIONS

International Search Report for International Application No. PCT/IB2013/059425 dated Apr. 4, 2014 (2 pages).

*Primary Examiner* — Dana Ross
*Assistant Examiner* — Kuangyue Chen
(74) *Attorney, Agent, or Firm* — Merchant & Gould P.C.

(57) ABSTRACT

An additivation device (2) for beverages (B) adds at least one additive (A) to at least one beverage (B). The device (2) includes at least one first inlet duct (30), through which at least one beverage (B) coming from a source is introduced into the device (2), and at least one second inlet duct (40), through which at least one additive (A) is introduced into the device (2). The additive (A) is a fluid and is contained in at least one container (21). The device includes at least one outlet duct (39), through which the beverage (B), to which said at least one additive (A) has been added, exits the device (2). The device (2) includes an additivator device (5) for taking a known quantity of the at least one additive (A) and mixing the additive (A) with the beverage (B). The device (2) supplies and mixes the at least one additive (A) with the beverage (B) while the beverage (B) is flowing between the at least one first inlet duct (30) and the outlet duct (39).

7 Claims, 2 Drawing Sheets

(58) Field of Classification Search
USPC .............. 99/287; 426/590; 222/129.4, 145.5, 222/383.2, 333
See application file for complete search history.

(56) References Cited

U.S. PATENT DOCUMENTS

| | | | |
|---|---|---|---|
| 2003/0121868 A1* | 7/2003 | Barak ........................ | C02F 1/50 210/764 |
| 2004/0187944 A1* | 9/2004 | O'Melia ................. | C02F 1/686 137/893 |
| 2009/0145926 A1* | 6/2009 | Klopfenstein ....... | B67D 1/0031 222/129.4 |
| 2012/0052159 A1* | 3/2012 | Doleac ................ | A47J 31/0668 426/79 |

FOREIGN PATENT DOCUMENTS

| WO | WO 2009/037610 | 3/2009 | | |
|---|---|---|---|---|
| WO | WO 2011144340 A1 * | 11/2011 | ............. | A23L 1/296 |

* cited by examiner

ADDITIVATION DEVICE FOR BEVERAGES AND METHOD THEREOF

This application is a National Stage Application of PCT/IB2013/059425, filed 17 Oct. 2013, which claims benefit of Serial No. TO2012A000930, filed 23 Oct. 2012 in Italy and which applications are incorporated herein by reference. To the extent appropriate, a claim of priority is made to each of the above disclosed applications.

BACKGROUND

The present invention relates to an additivation device for beverages such as, for example, water, and to an associated additivation method.

Said additivation device is adapted to mineralize said beverage by adding mineral salts and/or flavours.

The additivation process, implemented by means of said device, can simultaneously add at least one required substance to the beverage and dissolve it into the beverage in one step.

The additivation device can add mineral salts, for the purpose of mineralizing the beverage, e.g. water, or flavours, for the purpose of flavouring the same beverage.

Beverages like table water, whether bottled mineral water or spring water or waterworks' water, not always have satisfactory organoleptic and/or mineralization characteristics that suit, for example, each consumer's tastes. In fact, for each spring, waterworks or producer, the water will have particular mineralization characteristics making it different.

Purifiers of various kinds are known which are adapted to reduce specific elements and/or pollutants. Such purifiers cannot add any substances which may be lacking, e.g. mineral salts. On the other hand, water mineralization systems are known which are adapted to restore and supplement mineral salts reduced or even completely removed by the above-mentioned purifier. Such mineralizers are very complex and bulky, since they are designed for mixing the water in large containers before it can be dispensed.

Such mineralizers cannot be designed and implemented as a household appliance for family use. In fact, the dimensions of such devices are such that they can only be normally used in beverage production facilities, where large quantities of normally purified water are treated.

It is also known that bottled mineral water, since it cannot be modified by law, contains elements which are typical of the source it comes from, with no possibility of selection or modification.

SUMMARY

The present invention aims at solving the above technical problems by providing an additivation device adapted to produce a beverage, e.g. drinking water for family use, normally called table water, containing customizable chemical elements.

A first aspect of the present invention relates to an additivation device for adding an additive to a beverage.

Another aspect of the present invention relates to a water mineralization system.

A further aspect of the present invention relates to an additvation process for adding an additive to a beverage.

BRIEF DESCRIPTION OF THE DRAWINGS

The features and advantages of the additivation device and of the associated method will become apparent from the following description of different embodiments thereof and from the annexed drawings, wherein.

DETAILED DESCRIPTION

With reference to the above-listed drawings, additivation device 2 for beverages "B" is adapted to add at least one additive "A" to at least one beverage "B".

Device 2 comprises at least one first inlet duct 30, through which at least one beverage "B" is introduced into device 2 from a source.

For the purposes of the present invention, the term "source" refers to a beverage supply point, such as a natural source or a distribution network or a container containing said beverage "B", e.g. a silo or a can or a bottle.

The device according to the present invention further comprises at least one second inlet duct 40, through which at least one additive "A" is introduced into device 2.

Each additive "A" is contained in at least one container 21. Said container 21 is adapted to protect additive "A" contained therein against external agents such as moisture, pollutants, etc.

Preferably, said additive "A" is at least one mineral salt or a combination of salts and/or a flavour, both a natural or a chemically synthesized one.

Said additive may comprise those elements which best meet the consumer's needs.

Said additive "A" is preferably a fluid, e.g. a liquid, into which said at least one salt and/or one flavour have been dissolved and/or suspended.

Figure 1:
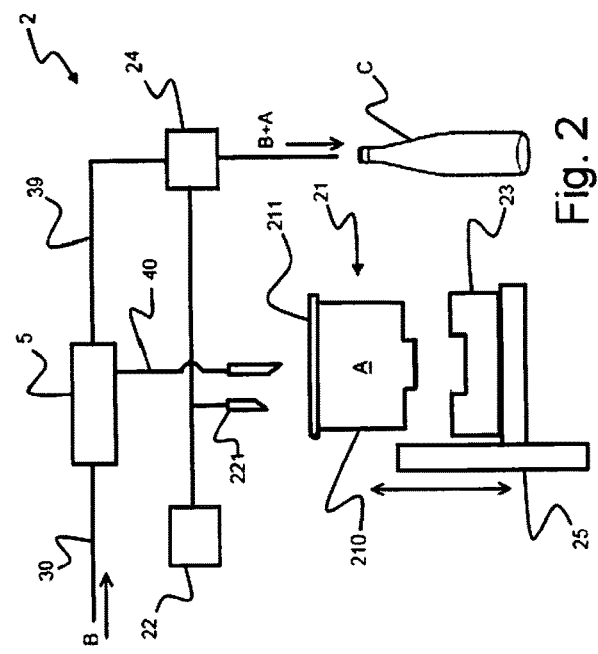
FIG. 1 shows the block diagram of a first embodiment of the additivation device for adding at least one additive to at least one beverage.

Device 2 comprises at least one outlet duct 39, through which said at least one beverage "B", to which said at least one additive "A" has been added, exits device 2, as shown in FIG. 1.

Preferably, device 2 according to the present invention comprises an air duct 22 for supplying air during the steps of adding additive "A" to beverage "B". Said air duct 22 comprises at least one dust filter.

Preferably, device 2 comprises a breakwater element 24 arranged along said outlet duct 39 for supplementing the final beverage with air before the beverage itself is dosed into a vessel "C".

For the purposes of the present invention, the term "final beverage" refers to a beverage "B", coming from said source, with which at least one additive "A" has been mixed.

Said vessel "C" may be, for example, a bottle or a pitcher.

Device 2 comprises an additivator device 5 for taking a known quantity of said at least one additive "A" and mixing the same additive "A" with said at least one beverage "B". Said additivator device 5 is monolithic, i.e. it is not made up of a combination of a dispenser and a mixer.

Said additivator device 5 is adapted for introducing said additive "A" into beverage "B" and mixing said at least one additive "A" with beverage "B". The above-mentioned introduction and mixing steps are carried out simultaneously. Said introduction and mixing steps are carried out while the same beverage "B" is flowing between said at least one first inlet duct 30 and said at least one outlet duct 39.

Figure 2:
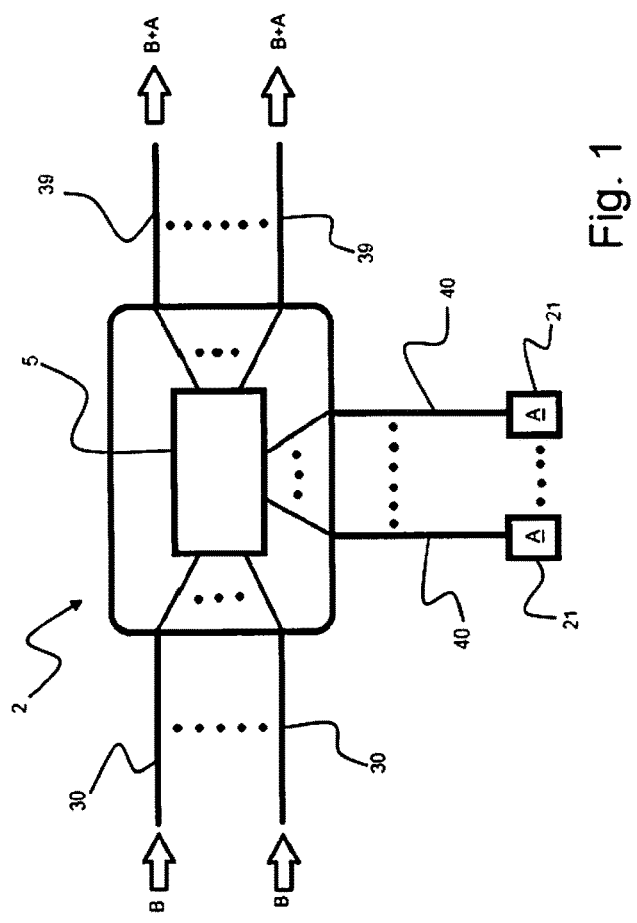
FIG. 2 shows the block diagram of a preferred embodiment of said device according to the present invention.

In the preferred embodiment, shown in FIG. 2, said steps take place through the Venturi effect.

More preferably, said additivator device 5 is a Venturi tube.

In an alternative embodiment, said additivator device 5 comprises at least one duct, through which beverage "B" flows towards outlet duct 39, and at least one pump, which is adapted to take in additive "A" and feed it into said at least one duct, which additive will then be mixed with said beverage "B". Said at least one duct is shaped in a manner such that it promotes the mixing of the additive with the beverage.

In the preferred embodiment, said at least one container 21 is adapted to contain a known quantity of additive "A". Preferably, container 21 is a single-dose container, e.g. a capsule. More preferably, said capsule is a prepackaged one.

In an alternative embodiment, said single-dose container 21 is a bag, e.g. made of thermoweldable material.

Said single-dose container 21 comprises an outer envelope 210 adapted for containing said additive "A" and insulating it from the outside environment. Said single-dose container 21 comprises at least one pierceable portion 211, e.g. a closure diaphragm.

Said at least one second inlet duct 40 is a cannula. Said cannula preferably comprises a pointed portion. Said cannula or second inlet duct 40 is adapted to pierce said pierceable portion 211 of container 21.

Preferably, said outer envelope 210 has known dimensions, preferably standard ones, and is, for example, cylindrical or substantially parallelepiped in shape, and is preferably made of plastic and/or thermoweldable materials, suitable for preserving, without contaminating it, said at least one additive "A" contained therein.

In the preferred embodiment, said capsule 21, in particular its outer envelope 210, has a substantially cylindrical shape with an upper base, which comprises said pierceable portion, and a lower base.

In the preferred embodiment, said device 2 comprises a housing 23 adapted to receive said single-dose container 21. The dimensions of said housing 23 are such that said single-dose container 21, preferably a capsule, can be properly and univocally positioned into it.

Preferably, the shape of said housing 23 is complementary to said capsule 21.

In the preferred embodiment, said housing 23 is adapted to univocally receive said capsule 21, which has a radial protrusion at its upper base that prevents the capsule itself from being positioned upside-down into housing 23. Preferably, the same capsule 21 comprises, preferably at its lower base, a protrusion that goes into a suitable groove comprised in housing 23.

Such a solution allows capsule 21 to be univocally positioned into housing 23.

The device according to the present invention further comprises an actuator 25 adapted to move said housing 23 from a first loading position, in which at least one single-dose container 21 can be placed into the same housing 23, to a second operating position, in which additivator device 5 can take said additive "A" from said single-dose container 21.

Said actuator device 25 is preferably automatic, e.g. a linear motor, or manual, e.g. a cam mechanism.

In the preferred embodiment, the length of said second inlet duct 40 or cannula is such that, when housing 23 is put into the operating position through said actuator 25, said cannula 40 is positioned in the proximity of the bottom of said container 21, e.g. a capsule, preferably in such a way as to come very close to it, so that it can take all additive "A" contained in the same container or capsule. In fact, while switching from the first loading position to the operating position, the cannula pierces pierceable portion 211 of single-dose container 21.

Said air duct 22 is also adapted to supply air into single-dose container 21 in order to replace the volume of additive "A" subtracted, e.g. by suction, by additivator device 5. The supply of air into single-dose container 21 prevents the same container, e.g. a capsule, from collapsing because of the removal of additive "A".

Said air duct 22 preferably comprises a second cannula 221 adapted to pierce said pierceable portion 211 of said single-dose container 21.

Said second cannula 221 is substantially similar to the second inlet duct 40.

The method for adding at least one additive "A" to at least one beverage "B" comprises the following steps:

taking at least one beverage "B" from a source;
taking at least one additive "A", contained in a container 21, to be added to beverage "B";
mixing said at least one additive "A" with said at least one beverage "B";
dosing the final beverage, preferably into a vessel "C".

The method steps of taking at least one additive "A" and mixing additive "A" with beverage "B" are carried out automatically and simultaneously by means of a single additivator device 5.

The method consists of mixing a certain quantity, e.g. 30 ml, of an additive "A" with a predetermined quantity, e.g. one litre, of a beverage "B", e.g. water, preferably distilled and/or purified water, so as to obtain a product having specific and customized chemical characteristics.

Water mineralization system 1 comprises an additivation device 2 according to the present invention.

Figure 3:
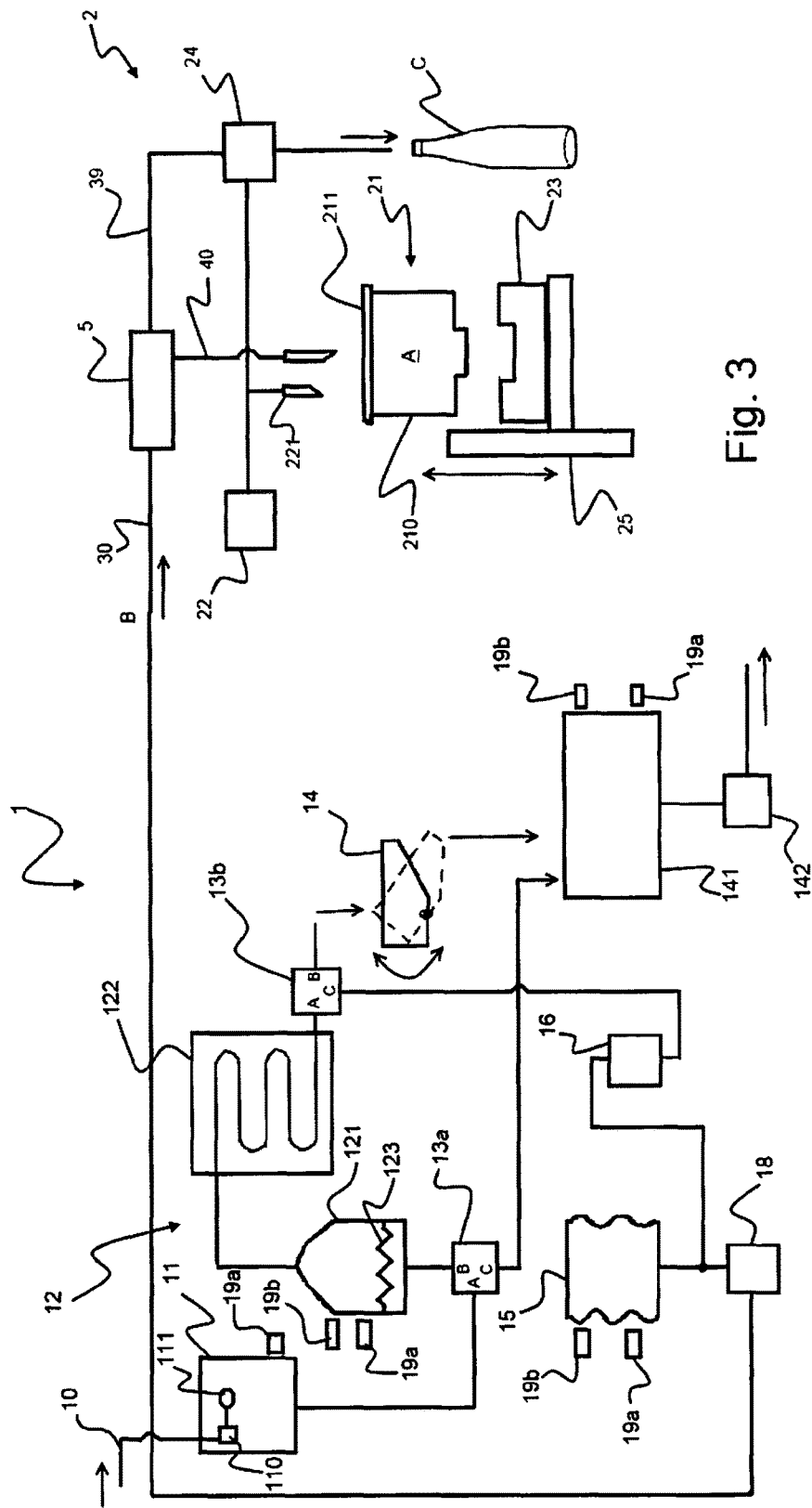
FIG. 3 shows a block diagram of an embodiment of the mineralization system, which comprises the additivation device according to the present invention.

In the non-limiting preferred embodiment shown in FIG. 3, said system 1 comprises at least one distiller 12.

More in detail, system 1 comprises at least one duct 10 adapted to be connected to at least one source of a beverage "B", preferably water.

Said source is preferably the household water main.

System 1 further comprises at least one first tank 11 having a known capacity, for containing the water supplied by means of said duct 10. Preferably, each first tank 11 comprises a float 111 valve 110, adapted to allow the tank to be selectively filled in dependence of the quantity of water already contained in tank 11 itself.

The water contained in said tank 11 is distilled through said at least one distiller 12.

Each distiller 12, e.g. of a known type, comprises a boiler 121 and a condenser 122.

System 1 further comprises at least one first electrovalve 13a, preferably a three-way one, and at least one second electrovalve 13b, preferably a three-way one. Both electrovalves (13a, 13b) are adapted to channel the distilled and undistilled water flows and the waste resulting from the distillation process. Moreover, system 1 comprises at least one collection tank 14, suitably pivoted; at least one first filter 16, preferably an activated-carbon filter for water purification, and at least one pump 18.

System 1 further comprises a deformable container 15 for containing distilled water, distilled through said distiller 12, and/or purified water, e.g. purified through at least one filter 16. Said collection tank 14 is adapted to discharge the waste into a collector 141. Said collector 141 is adapted to contain the waste of the distillation process.

In a preferred embodiment, said collector 141 comprises a drain pump 142 for draining the waste contained in collector 141 without the latter needing to be extracted.

In an alternative embodiment, said collector 141 can be extracted to be emptied when full, without the presence of a drain pump.

Said system 1 comprises a plurality of level sensors (19a, 19b) adapted to control the liquid levels in the various devices comprised in the various stages of system 1 according to the present invention.

Preferably, the system comprises minimum level sensors 19a and maximum level sensors 19b.

Describing more in detail the operation of the devices comprised in system 1 according to the present invention, the first tank 11 is automatically kept full of water. Said water preferably comes from the water main, for example, and is supplied through duct 10. Valve 110 and float 111 are adapted to either stop or allow filling said first tank 11.

Preferably, said first tank 11 comprises a minimum level sensor 19b.

In an alternative embodiment, said first tank 11 can be filled manually, e.g. by means of a suitable container, not shown.

Distiller 12 is adapted to distill the water contained in said first tank 11. The distilled water is then directed towards said deformable container 15. In particular, said distiller 12 is activated when the level of distilled water in deformable tank 15 is under a predetermined threshold, e.g. a minimum threshold measured by a minimum level sensor 19a. Said distiller 12 can only be activated in the presence of water in the first tank 11, the quantity of which must be at least equal to the capacity of boiler 121. Preferably, the presence of water in tank 11 is detected by a minimum level sensor 19a.

Said first electrovalve 13a, in a first position A-B, allows a certain quantity of water to fall from tank 11 into boiler 121. Said boiler 121 comprises a maximum level sensor 19b. This latter maximum level sensor 19b sends a signal to close the first electrovalve 13a and to activate at least one heating element 123, comprised in said boiler 121. The activation of said at least one heater and the closure of the valve are subordinate to the achievement of the maximum water level in boiler 121.

A first fraction of the distillate exiting condenser 122 reaches collection tank 14, e.g. a pluviometer, through the second electrovalve 13b in a first position A-B.

As soon as a predetermined quantity of distillation waste is reached, said collection tank 14 rotates about the pivot point, thus turning over. The overturning of tank 14 causes the contents of same tank 14 to be collected into collector 141. Once its contents have been discharged, tank 14 returns into its initial position. As it rotates about its pivot point, tank 14 sends a switching signal to the second electrovalve 13b. Said second electrovalve 13b thus switches into a second position A-C. This switching of the second electrovalve 13b causes the distillate coming from condenser 122 to reach deformable container 15 through filter 16.

In the preferred embodiment, said filter 16 is adapted to capture and retain any sporadic molecules dragged by the steam currents coming from distiller 12. Since it acts upon distilled and sterile water, said filter 16 does not need to be replaced at short intervals, unlike those of prior-art purifiers and/or mineralizers.

Said deformable container 15 acts as a bladder, accumulating the distillate and expanding as the quantity of distillate increases. The inner walls of said container 15 always stay in contact with the distillate, thereby insulating the liquid from the outside environment. This solution prevents any possible contamination of the distillate.

When the water level in boiler 121 drops below the level perceivable by a minimum level sensor 19a comprised in boiler 121, the water heating through heating element 123 is stopped. The same minimum level sensor 19a, in addition to turning off the heating, switches said first electrovalve 13a into a second position B-C. This switching causes the water residue contained in boiler 121 to be directed towards collector 141, e.g. by falling. Such waste residue mixes with the first waste portion, called distillate head, which is already present in collector 141, thus lowering the temperature of the second waste portion, since said first portion is at ambient temperature.

During the switching of said first electrovalve 13a, also the second electrovalve 13b switches into the first position A-B, thereby allowing air to enter the upper part of boiler 121 to facilitate the draining of the same boiler 121.

This operating configuration is kept until boiler 121 has been completely drained. In order to determine when boiler 121 is completely empty, in a first embodiment system 1 comprises a timer device which, after a predetermined period of time has elapsed since the switching of the electrovalves (13a, 13b), e.g. a time between 10 seconds and 1 minute, switches electrovalves (13a, 13b) again to refill boiler 121 as previously described. Once said boiler 121 has been drained, the electrovalves are switched again to allow said boiler 121 to be refilled as previously described.

In one embodiment, a sensor is included for detecting the presence of a liquid, e.g. in the last duct section towards collector 141. The draining condition of boiler 121 is kept until the presence of liquid is detected, e.g. a liquid flow, towards collector 141.

The water distillation process goes on automatically until the distilled water in deformable container 15 reaches the maximum level, which is detected through a maximum level sensor 19b comprised in container 15 itself. After having reached said maximum level of distilled water, distiller 12 completes the ongoing cycle until the tail waste is discharged, then it turns itself off. Maximum level sensor 19b is positioned in a manner such that container 15 can receive any remaining distillate of the ongoing cycle.

Said deformable container 15 further comprises a minimum level sensor 19a adapted to detect the presence of distilled water in container 15 itself. The presence of distilled water in container 15 at a level equal to or higher than the one detectable by the minimum level sensor 19a allows the execution of the additivation or mineralization step.

The water is mineralized in accordance with the previously described additivation process of the present invention.

More in detail, as shown in FIG. 3, at least one single-dose container 21, e.g. a capsule or a bag, is introduced into respective housing 23 of additivation device 2.

Said actuator 25 is subsequently activated, which, as aforementioned, may be either automatic or manual. The activation of said actuator 25 causes said housing 23 to move from the loading position, for positioning single-dose container 21, to the operating position. Said movement of housing 23 pushes said container 21 against the second inlet duct or cannula 40, which is adapted to pierce pierceable portion 211 of container 21.

Pierceable portion 211 is pierced not only by said second inlet duct 40, but also by a second cannula 221. Said second cannula 221 is adapted to supply air into single-dose container 21, e.g. a capsule 21, while additivator device 5 is removing, e.g. by suction through the Venturi effect, additive "A" contained in container 21.

In dependence of the achievement of the operating position of housing 23 and of the piercing of container or capsule 21, pump 18 is activated to allow water to flow from deformable container 15 to additivation device 2 through said at least one first inlet duct 30. The water flow through said first inlet duct 30 in additivator device 5 allows the contents of container 21 to be taken through the Venturi effect and introduced into the running water flow. The suction and introduction into the water flow allows mixing together the water and additive "A". At the outlet of additivator device 5, the mixture of distilled water and additives "A" exits device 2 through said at least one outlet duct 39. The same mixture flows through said known breakwater element 24, which is adapted to compensate for the air subtracted from the water during the distillation process.

The capacity of vessel "C", e.g. a bottle, is preferably sufficient to contain the expected volumetric ratio between distilled water and additive.

The structural characteristics of additivator device 5, and in particular of the Venturi tube, are such that additives "A" are taken from one or more single-dose containers 21 preferably prior to reaching the first half of the capacity of vessel "C". This solution prevents the deposition of residues of said additives "A" in outlet duct 39, while also promoting the mixing of the additives "A" with the beverage "B". The waste products contained in collector 141 are evacuated, preferably automatically, by means of said drain pump 142. Said drain pump 142 is activated in dependence of the signals received from maximum and minimum level sensors (19b, 19a) comprised in collector 141.

System 1 according to the present invention allows obtaining a perfectly sterile product meeting personal requirements like the type and quantity of specific elements, such as: sodium, potassium, calcium, magnesium, etc.

Additives "A" to be introduced into and mixed with the beverage may be elements useful for the human body, which however cannot generally be found in normal bottled water or in water from the water main.

Said additives "A" may also be elements suitable to give beverages special flavours such as: lemon, orange, etc.

Said additives may also be elements suitable for enhancing the flavour of tea, coffee and tisanes.

The use of single-dose containers 21, such as capsules and/or bags, allows the final beverage to be customized in accordance with the user's needs and/or tastes. In fact, two consecutive users will be able to obtain very different final beverages without having to structurally modify the device or the system. As a matter of fact, it will be sufficient to choose capsules and/or bags containing different additives "A", without leaving any residue that might alter subsequent additivations.

This device and this system can be easily operated by the final user.

Said device or system can be easily applied to a household water main.

REFERENCE NUMERALS

Mineralization system 1
Duct 10
First tank 11
Valve 110
Float 111
Distiller 12
Boiler 121
Condenser 122
Heating element 123
First electrovalve 13a
Second electrovalve 13b
Collection tank 14
Collector 141
Drain pump 142
Deformable container 15
First filter 16
Pump 18
Minimum level sensor 19a
Maximum level sensor 19b
Additivation device 2
Container 21
Outer envelope 210
Pierceable portion 211
Air duct 22
Second cannula 221
Housing 23
Breakwater element 24
Actuator 25
First inlet duct 30
Outlet duct 39
Second inlet duct 40
Additivator device 5
Additive A
Beverage B
Vessel C

The invention claimed is:

1. An additivation device for beverages, for adding an additive to a beverage; the additivation device comprising:
   a first inlet duct, through which said beverage is introduced into the additivation device from a source;
   a second inlet duct, through which said additive is introduced into the additivation device; said additive is contained in a capsule;
   an outlet duct, through which the beverage, to which said additive has been added, exits the additivation device;
   an additivator device for taking a known quantity of said additive and simultaneously mixing said additive with said beverage, by introducing and simultaneously mixing said additive with the beverage while the beverage is flowing between said first inlet duct and said outlet duct; said additivator device is a Venturi tube;
   said capsule contains a known quantity of said additive;
   said Venturi tube is adapted for introducing said additive into said beverage by removing all of said additive contained in said capsule,
   said Venturi tube is operable to mix said additive with said beverage; and
   said Venturi tube is operable to simultaneously remove the additive from said capsule and mix the additive with said beverages;
   said capsule comprises a pierceable portion;
   said second inlet duct comprises a cannula;
   said cannula comprising a pointed portion for piercing said pierceable portion of said capsule;
   said cannula having a length to position a distal end of said cannula proximate a bottom of said capsule.

2. The device according to claim 1, wherein said capsule is a prepackaged single-dose container containing 30 ml of said additive.

3. The device according to claim 1, comprising an air duct for supplying air inside said capsule.

4. The device according to claim 1, comprising a breakwater element arranged along said outlet duct for supplementing the beverage with air prior to dosage.

5. The device according to claim 1, comprising an air duct adapted to supply air into the capsule in order to replace a volume of said additive subtracted by the additivator device.

6. Water mineralization system, comprising a distiller, said distiller comprising an additivation device according to claim 1.

7. The system according to claim 6, comprising:
a deformable container for containing either distilled water, distilled by said distiller, or purified water.

* * * * *